US006496191B2

(12) United States Patent
Asai et al.

(10) Patent No.: US 6,496,191 B2
(45) Date of Patent: *Dec. 17, 2002

(54) METHOD AND APPARATUS FOR CHARACTER FONT GENERATION WITHIN LIMITATION OF CHARACTER OUTPUT MEDIA AND COMPUTER READABLE STORAGE MEDIUM STORING CHARACTER FONT GENERATION PROGRAM

(75) Inventors: Yoshimi Asai, Osaka; Susumu Hasegawa, Sakai; Noriyuki Koyama, Kyoto; Yuka Yabuuchi, Yamatokoriyama, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,966

(22) Filed: May 25, 1999

(65) Prior Publication Data

US 2002/0070938 A1 Jun. 13, 2002

(30) Foreign Application Priority Data

May 29, 1998 (JP) ............................................ 10-149399

(51) Int. Cl.[7] .............................................. G06T 11/00
(52) U.S. Cl. ........................ 345/467; 345/469; 345/471
(58) Field of Search .......................... 345/471, 467–470

(56) References Cited

U.S. PATENT DOCUMENTS 4,881,069 A * 11/1989 Kameda et al. ............. 345/471
5,526,476 A * 6/1996 Motokado et al. .......... 345/471
5,537,131 A 7/1996 Mitsuhashi et al.

FOREIGN PATENT DOCUMENTS

| EP | 471482 A2 | 2/1992 |
| GB | 2273805 A | 12/1993 |
| JP | 7077969 | 3/1995 |
| JP | 07281657 A | 10/1995 |
| JP | A944135 | 2/1997 |
| JP | A10 49129 | 2/1998 |

OTHER PUBLICATIONS

"Automatic Scaling of Digital Print Fonts", R.G. Casey et al., *IBM J Res. Development*, vol. 26, No. 6, pp. 657–667, Nov. 1982.

Eiji Nagata et al, Nikkei Electronics, Apr. 7, 1997, No. 686, pp.137–147.

* cited by examiner

*Primary Examiner*—Jeffery Brier
*Assistant Examiner*—Faranak Fouladi

(57) ABSTRACT

A character font generation apparatus generates a font of a character for the output of the character to an output unit. First, whether the character specified through the operation of an input unit can be output in a desired font based on a predetermined resolution of the output unit or not is determined. If the result of the determination is no, a stroke of the character is omitted to reduce the size of the character, to allow the correct output according to the predetermined resolution. The stroke omission is performed with reference to contents of a memory storing various information necessary for the character font generation and a priority determination rule indicating various information for determining the priority of stroke omission, so as to maintain the balance and to preserve the shape (contour) of the character.

7 Claims, 13 Drawing Sheets

FIG.3

| 40 : TOTAL NUMBER OF STROKES | 41 : VERTICAL STROKE WIDTH | 42 : HORIZONTAL STROKE WIDTH |
|---|---|---|
| | | |
| n+1～n+i1 | VW1 | HW1 |
| n+i1+1～n+i1+i2 | VW2 | HW2 |
| n+i1+i2+1～n+i1+i2+i3 | VW3 | HW3 |
| n+i1+i2+i3+1～n+i1+i2+i3+i4 | VW4 | HW4 |
| n+i1+i2+i3+i4+1～ | VW5 | HW5 |

FIG.5

| 30: CHARACTER CODE | 70: TYPE INFORMATION | 50: TOTAL HORIZONTAL RANK | 5A: HORIZONTAL RANK OF CHARACTER AREA A | 5B: HORIZONTAL RANK OF CHARACTER AREA B | 5C: HORIZONTAL RANK OF CHARACTER AREA C |
|---|---|---|---|---|---|
| 30: CHARACTER CODE | 70: TYPE INFORMATION | 50: TOTAL HORIZONTAL RANK | 5A: HORIZONTAL RANK OF CHARACTER AREA A | 5B: HORIZONTAL RANK OF CHARACTER AREA B | 5C: HORIZONTAL RANK OF CHARACTER AREA C |

FIG.8A

30 : CHARACTER CODE

70 : TYPE INFORMATION

| FIRST CHARACTER AREA | W1 : CHARACTER AREA WIDTH | H1 : CHARACTER AREA HEIGHT |
|---|---|---|
| | RX1 : RATIO OF CHARACTER AREA TO CHARACTER AREA CIRCUMSCRIBING FRAME IN X DIRECTION (CHARACTER AREA RATIO) | RY1 : RATIO OF CHARACTER AREA TO CHARACTER AREA CIRCUMSCRIBING FRAME IN Y DIRECTION (CHARACTER AREA RATIO) |
| | SI1 : INFORMATION ON NUMBER OF STROKES IN CHARACTER AREA | |
| | CI1 : CONTACT INFORMATION OF CHARACTER AREA | |

⋮

| Nth CHARACTER AREA | WN : CHARACTER AREA WIDTH | HN : CHARACTER AREA HEIGHT |
|---|---|---|
| | RXN : RATIO OF CHARACTER AREA TO CHARACTER AREA CIRCUMSCRIBING FRAME IN X DIRECTION (CHARACTER AREA RATIO) | RYN : RATIO OF CHARACTER AREA TO CHARACTER AREA CIRCUMSCRIBING FRAME IN Y DIRECTION (CHARACTER AREA RATIO) |
| | SIN : INFORMATION ON NUMBER OF STROKES IN CHARACTER AREA | |
| | CIN : CONTACT INFORMATION OF CHARACTER AREA | |

FIG.8B

SIj

| VS : NUMBER OF VERTICAL STROKES |
|---|
| HS : NUMBER OF HORIZONTAL STROKES |
| SS : NUMBER OF SLANTING STROKES |

FIG.8C

CIj

| UPPER FRAME LINE |
|---|
| U1 : NUMBER OF POINT CONTACTS |
| U2 : NUMBER OF LINE CONTACTS |
| U3 : NUMBER OF LENGTHWISE CONTACTS |
| RIGHT-SIDE FRAME LINE |
| R1 : NUMBER OF POINT CONTACTS |
| R2 : NUMBER OF LINE CONTACTS |
| R3 : NUMBER OF LENGTHWISE CONTACTS |
| LOWER FRAME LINE |
| B1 : NUMBER OF POINT CONTACTS |
| B2 : NUMBER OF LINE CONTACTS |
| B3 : NUMBER OF LENGTHWISE CONTACTS |
| LEFT-SIDE FRAME LINE |
| L1 : NUMBER OF POINT CONTACTS |
| L2 : NUMBER OF LINE CONTACTS |
| L3 : NUMBER OF LENGTHWISE CONTACTS |

METHOD AND APPARATUS FOR CHARACTER FONT GENERATION WITHIN LIMITATION OF CHARACTER OUTPUT MEDIA AND COMPUTER READABLE STORAGE MEDIUM STORING CHARACTER FONT GENERATION PROGRAM

BACKGROUND OF THE INVENTION

1. Field of the Invention

The present invention relates to a method and an apparatus for character font generation within limitation of character output media, and a computer readable storage medium storing a character font generation program. More particularly, it relates to a method and an apparatus for character font generation and a computer readable storage medium storing a character font generation program, for simplifying a collection of strokes constituting a character according to the limitation of output media receiving the character.

2. Description of the Background Art

In Nikkei Electronics, 1997. 4. 7 (no. 686), p.137–147, a technique for developing a multi-gray scale Japanese font in dots by a method of surface integral is described.

In the method of surface integral, a gray-scale value of a character is determined with use of an outline of the character, by first obtaining a correction value based on a value of an area surrounded by the outline in each pixel, and then determining a final gray-scale value by adding the correction value to a predetermined basic gray-scale value.

A method of developing dots with an intermediate gray-scale, such as the above mentioned method of surface integral, however, cannot be employed when the gray-scale level of dot is insufficient and in some cases a generated character may be crushed or blurred as a whole and becomes illegible.

SUMMARY OF THE INVENTION

An object of the present invention is, therefore, to provide a method and an apparatus for character font generation capable of generating a character font allowing an output of an easily recognizable character, regardless of any limitation of character output media; and a computer readable storage medium storing a character font generation program.

To achieve the above mentioned object, the method of character font generation according to the present invention includes the steps of determining whether a character can be output in a desired font to an output unit having a predetermined resolution, and of omitting a stroke of the character so as to make the size of the character a size permitting output thereof according to the predetermined resolution, in response to determining that a character cannot be output. The omission in the step of omitting is performed so as to maintain the balance of the character and preserve the shape (contour) of the character.

Thus, the stroke is omitted to allow the output of the character according to the resolution of the output unit while the balance of the character is maintained and the shape (contour) of character is preserved. Therefore, the character can be output without being limited by the resolution of the output unit.

In addition, even though the stroke of the character is omitted, as the balance and the shape (contour) thereof are maintained, the typeface is preserved in the output character and the visibility of the character is not deteriorated.

The method of character font generation described above may further include a reduction step and a generation step in the step of omitting.

In the reduction step, the character is reduced until each stroke of the character comes into contact with one of another stroke, a circumscribing frame containing a body size area of the character and a splitting frame splitting the body size area into a plurality of character areas based on the configuration of the character.

In the generation step, a character area balance database (hereinafter also referred to as DB) including a ratio of the size of the splitting frame to the size of the circumscribing frame and contact information regarding manner of contact of a stroke with each line of splitting frame in each splitting frame for each character area is generated based on the result of reduction in the reduction step.

In addition, in the step of omitting, which stroke of the character is to be omitted is determined based on the contact information and the stroke is omitted until the size of the character becomes the size allowing output thereof, while the ratio of the size of each character area in the character area balance database is maintained.

Thus, the omission of the stroke in the step of omitting is performed based on the contact information while the ratio of the size of splitting frame to the size of circumscribing frame of each character area indicating the balance of the character is maintained. Therefore, the balance of the character, that is a typeface, is maintained without being changed in the omission process of the stroke. In addition, as the omission of the stroke is performed according to the contact information of each splitting frame, a stroke relating to the shape (contour) of the character is easily and securely maintained.

The contact information according to the method of character font generation described above may include a number of contacts between an edge portion of the stroke and the splitting frame line, a number of contacts between an edge line having a length corresponding to the width of the stroke and the splitting frame line and a number of contacts between a lengthwise line of the stroke and the splitting frame line.

Thus, which stroke is to be omitted can be determined based on the number of contacts between the edge portion of the stroke and the splitting frame line, the number of contacts between the edge line corresponding to the stroke width and the splitting frame line and the number of contacts between the lengthwise line of the stroke and the splitting frame line. Therefore, the priority (weighting) of the stroke omission can be flexibly determined case by case, and the output character with strokes omitted and superior visibility can be readily obtained.

In the determination of the stroke to be omitted described above, when the contact information indicates the contact of the lengthwise line of the stroke and the splitting frame line, if the distance between the character and the circumscribing frame line is shortest at this lengthwise line of the stroke, the stroke will not be omitted. Otherwise, the omission of the stroke may be determined based on the contact information of the adjacent stroke.

Hence, when the lengthwise line of the stroke contacts with the splitting frame line and the distance between the character and the circumscribing frame is shortest at this lengthwise line, the stroke is determined not to be omitted. In other words, the stroke relating to the shape (contour) of the character is determined to be preserved. Otherwise, the omission is determined based on the contact information of the adjacent stroke. In other words, the weighting regarding the omission of the inner stroke of the character is determined in detail.

Thus, the stroke can be omitted to provide an improved visibility while the shape (contour) of the character is securely preserved.

In the desired font mentioned above, the stroke width of the character can be set according to the total number of the strokes of the character.

Thus, the stroke width in the output character font is set according to the total number of the strokes. Therefore, at the output of the character, a uniform density of color can be obtained for all characters regardless of the total number of the strokes, whereby the visibility is improved.

One of a plurality of splitting patterns previously prepared is applied for splitting the body size area as described above based on the configuration of the character, and the plurality of splitting patterns may be generated as combinations of at least one specific splitting pattern.

Thus, the plurality of splitting patterns are each prepared as a combination of a specific splitting pattern. Therefore, preparation of a specific splitting pattern alone and not the plurality of splitting patterns is required, whereby the storage capacity necessary for preparing the splitting pattern is reduced.

The apparatus for character font generation according to the present invention includes a determination unit for determining whether a character can be output in a desired font to an output unit having a predetermined resolution, and an omission unit for omitting a stroke of the character so as to make the size of the character the size allowing output thereof according to the predetermined resolution according to the determination of "output not allowed" by the determination unit. The omission is performed so as to maintain the balance of the character and preserve the shape (contour) of the character.

Thus, the stroke is omitted to allow the output of the character according to the resolution of the output unit while the balance of the character is maintained and the shape (contour) of character is preserved. Therefore, the character can be output without being limited by the resolution of the output unit.

In addition, even though the stroke of the character is omitted, as the balance and the shape (contour) thereof are maintained, the typeface is preserved also in the output character and the visibility of the character is not deteriorated.

In the apparatus for character font generation described above, the omission unit may includes a reduction unit and a generation unit as set forth below.

The reduction unit reduces the character until each stroke of the character comes into contact with one of another stroke, and includes a circumscribing frame containing a body size area of the character and a splitting frame for splitting the body size area into a plurality of character areas based on the configuration of the character. The generation unit generates a character area balance database including a ratio of the size of the splitting frame to the size of the circumscribing frame and contact information regarding a manner of contact of a stroke with each line of splitting frame in each splitting frame for each character area based on the result of reduction by the reduction unit. The omission unit, thus determines which stroke of the character is to be omitted based on the contact information and omits the stroke until the size of the character becomes the size allowing output thereof, maintaining the ratio of the size of each character area in the character area balance database.

Thus, the omission of the stroke by the omission unit is performed based on the contact information while the ratio of the size of splitting frame to the size of circumscribing frame of each character area indicating the balance of the character is maintained. Therefore, the balance of the character, that is the typeface, is maintained without being changed in the omission process of the stroke. In addition, as the omission of the stroke is performed according to the contact information of each splitting frame line, a stroke relating to the shape (contour) of the character is easily and securely maintained.

The contact information in the apparatus of character font generation described above may include the number of contacts between an edge portion of the stroke and the splitting frame line, the number of contacts between an edge line having a length corresponding to the width of the stroke and the splitting frame line and the number of contacts between a lengthwise line of the stroke and the splitting frame line.

Thus, which stroke is to be omitted can be determined based on the number of contacts between the edge portion of the stroke and the splitting frame line, the number of contacts between the edge line corresponding to the stroke width and the splitting frame line and the number of contacts between the lengthwise line of the stroke and the splitting frame line. Therefore, the priority (weighting) of the stroke omission can be flexibly determined case by case, and the output character with strokes omitted and superior visibility can be readily obtained.

In the determination of the stroke to be omitted in the apparatus for character font generation described above, when the contact information indicates the contact of the lengthwise line of the stroke and the splitting frame line, if the distance between the character and the circumscribing frame line is shortest at this lengthwise line of the stroke, the stroke will not be omitted and otherwise the omission of the stroke may be determined based on the contact information of the adjacent stroke.

Hence, when the lengthwise line of the stroke contacts with the splitting frame line and the distance between the character and the circumscribing frame is shortest at this lengthwise line, the stroke is determined not to be omitted. In other words, the stroke relating to the shape (contour) of the character is determined to be preserved. Otherwise, the omission is determined based on the contact information of the adjacent stroke. The weighting regarding the omission is determined in detail.

Thus, the stroke can be omitted to provide an improved visibility while the shape (contour) of the character is securely preserved.

In the desired font in the apparatus for character font generation mentioned above, the stroke width of the character can be set according to the total number of the strokes of the character.

Thus, the stroke width in the output character font is set according to the total number of the strokes. Therefore, at the output of the character, a uniform density of color can be obtained for all characters regardless of the total number of the strokes whereby the visibility is improved.

In the apparatus for character font generation described above, one of a plurality of splitting patterns previously prepared is applied for splitting the body size area as described above based on the configuration of the character, and the plurality of splitting patterns may be generated as combinations of at least one specific splitting pattern.

Thus, the plurality of splitting patterns are each prepared as a combination of at least one specific splitting pattern. Therefore, preparation of a specific splitting pattern alone and not the plurality of splitting patterns is required, whereby the storage capacity of the apparatus necessary for preparing the splitting pattern is reduced.

In the computer readable storage medium storing a character font generation program for causing a computer to perform the method of character font generation according to the present invention, the method of character font generation includes the steps of determining whether a character can be output in a desired font to an output unit having a predetermined resolution, and, of omitting a stroke of the character so as to make the size of the character the size allowing output thereof according to the predetermined resolution according to the determination of "output not allowed" in the step of determining. The omission is performed so as to maintain the balance of the character and preserve the shape of the character.

Thus, the stroke is omitted to allow the output of the character according to the resolution of the output unit while the balance of the character is maintained and the shape of character is preserved. Therefore, the character can be output without being limited by the resolution of the output unit.

In addition, even though the stroke of the character is omitted, as the balance and the shape thereof are maintained, the typeface is preserved also in the output character and the visibility of the character is not deteriorated.

In the computer readable storage medium storing a character font generation program for causing a computer to perform the method of character font generation described above, the step of omitting in the method of character font generation may further includes a reduction step and a generation step. In the reduction step, the character is reduced until each stroke of the character comes into contact with one of another stroke, a circumscribing frame containing a body size area of the character and a splitting frame splitting the body size area into a plurality of character areas based on the configuration of the character. In the generation step, a character area balance database including a ratio of the size of the splitting frame to the size of the circumscribing frame for each character area and contact information regarding a manner of contact of a stroke with each line of splitting frame in each splitting frame is generated based on the result of reduction in the reduction step. In addition, in the step of omitting, which stroke of the character is to be omitted is determined based on the contact information and the stroke is omitted until the character becomes the size allowing output thereof while the ratio of the size of each character area in the character area balance database is maintained.

Thus, the omission of the stroke in the step of omitting is performed based on the contact information while the ratio of the size of splitting frame to the size of circumscribing frame of each character area indicating the balance of the character is maintained. Therefore, the balance of the character, that is the typeface, is maintained without being changed in the omission process of the stroke. In addition, as the omission of the stroke is performed according to the contact information of each splitting frame, a stroke relating to the shape (contour) of the character is easily and securely maintained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a structure of a weight (thickness) DB according to an embodiment of the present invention.

FIG. 5 is a diagram showing a structure of a horizontal rank DB according to an embodiment of the present invention.

FIGS. 8A–8C are diagrams showing a structure of a character area balance DB according to an embodiment of the present invention.

DESCRIPTION OF THE PREFERRED EMBODIMENTS

Figure 1:
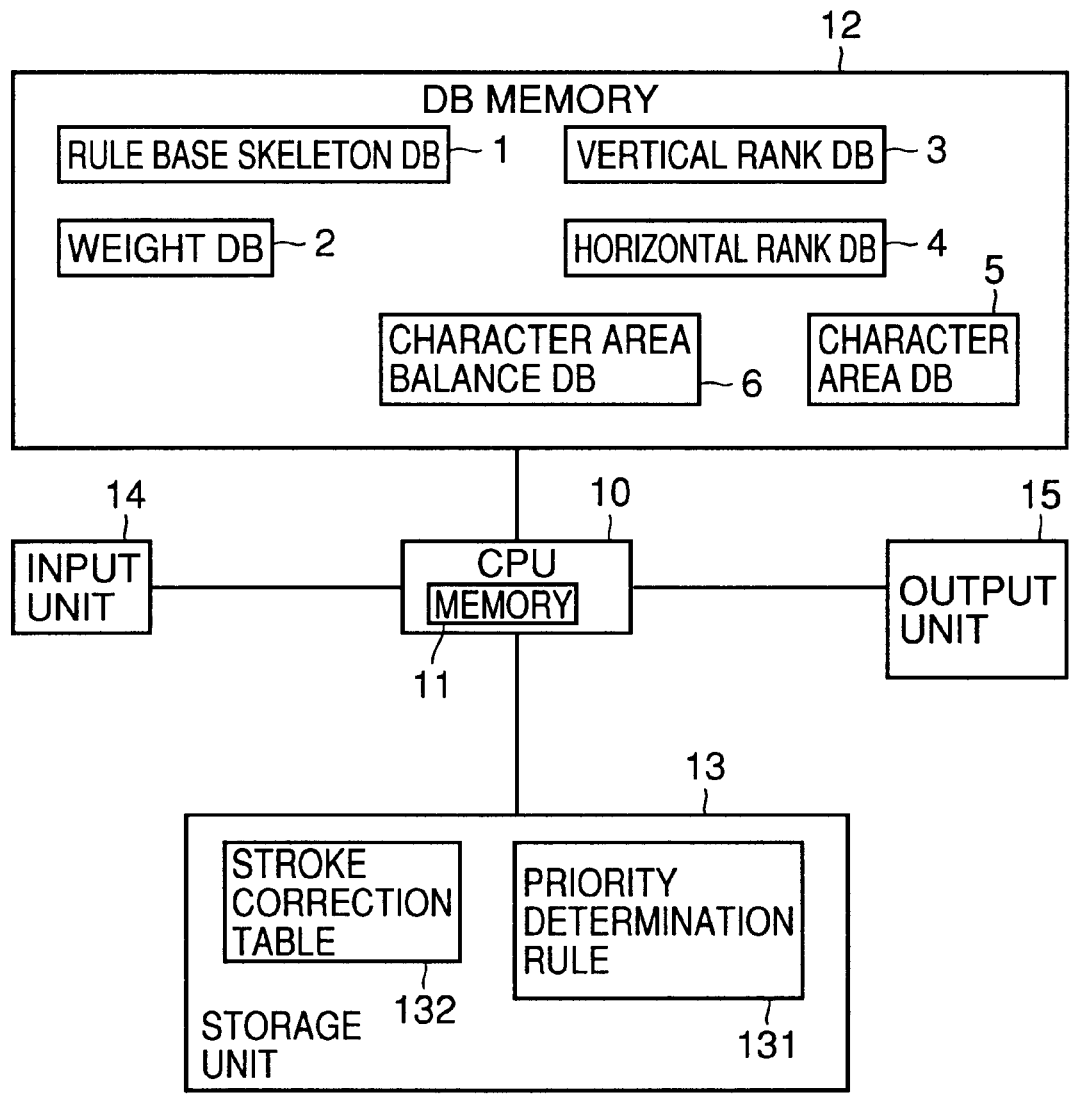
FIG. 1 is a block diagram of an apparatus for character font generation according to an embodiment of the present invention.

An embodiment of the present invention will be described hereinafter with reference to the drawings. In the embodiment, characters include hiraganas, katakanas, alphabets, symbols, numbers, kanjis (Chinese characters) and so on, and a different character code is assumed to be allotted to each character. In the description, a character font indicates data used for displaying a character in various typefaces.

An apparatus for character font generation according to the embodiment of the present invention shown in FIG. 1 includes: a CPU (central processing unit) 10 having a memory 11 for controlling and managing the apparatus in a centralized manner; a DB (database) memory 12 for storing a variety of DBs; a storage unit 13 for storing data such as a stroke correction table 132 and a priority determination rule 131 described below; an input unit 14 such as a keyboard for example; and an output unit 15 such as a liquid crystal display, a printer or the like.

DB memory 12 includes a rule base skeleton DB 1 and a weight DB 2, a vertical rank DB 3, a horizontal rank DB 4, and a character area DB 5 and a character area balance DB 6, referenced for the character font generation according to the embodiment of the present invention.

Figure 2:
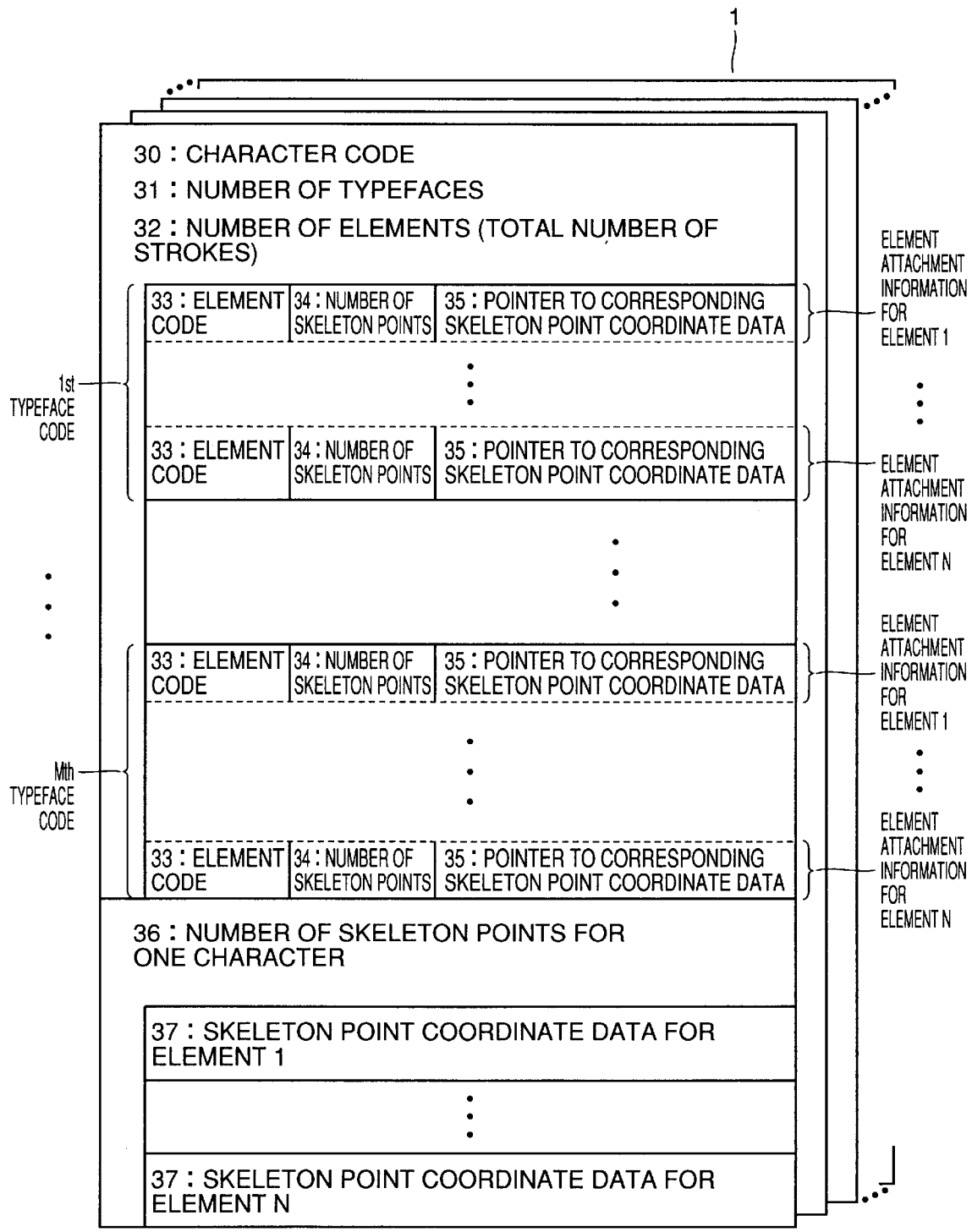
FIG. 2 is a diagram showing a structure of a rule base skeleton DB according to an embodiment of the present invention.

In FIG. 2, a structure of rule base skeleton DB 1 is shown. Rule base skeleton DB 1 shown in FIG. 2 is prepared individually for each character code and includes a character code 30, a number of typefaces 31, a number of elements (a total number of strokes) 32, element attachment information for each element, a number of skeleton points for one character 36, and skeleton point coordinate data 37 for each element. In FIG. 2, it is assumed that number of typefaces 31 indicates M and number of elements 32 indicates N.

Number of elements 32 corresponds to the total number of strokes of a character identified by a corresponding character code 30. In FIG. 2, for example, the database includes element attachment information consisting of an element code 33, a number of skeleton points 34, and a pointer 35 to a corresponding skeleton point coordinate data 37 for each stroke, that is, for each of N elements in each of M typefaces (M is indicated by number of typefaces 31).

Number of skeleton points 34 indicates the number of coordinate points required for forming a character using corresponding elements as skeletons. Pointer 35 to skeleton point coordinate data 37 is a pointer value for coordinate data 37 for uniquely identifying each coordinate point of the number indicated by number of skeleton points 34. Element code 33 identifies unique element (modeling) information of a corresponding typeface attached to a skeleton of each element.

FIG. 3 shows a structure of a weight (thickness) DB. Here, weight (thickness) indicates stroke width. Characters, especially kanjis (Chinese characters) vary in the number of their strokes. When all the strokes of all the characters are displayed in the same width at the output, a significant fluctuation in density is visually generated and visibility is severely deteriorated. Therefore, in the embodiment of the present invention, the stroke width is variably set according to the total number of strokes of the character with reference to weight (thickness) DB 2 shown in FIG. 3 to preserve uniform density of all the output characters.

In weight (thickness) DB 2 shown in FIG. 3, the total numbers of strokes 40 of the characters are divided into five stages. A vertical stroke width 41 and a horizontal stroke width 42 of the character are stored for each stage. At a curve which cannot be clearly defined as being vertical nor horizontal, the stroke width is adjusted by turning the stroke using vertical stroke width 41 as a reference.

Figure 4:
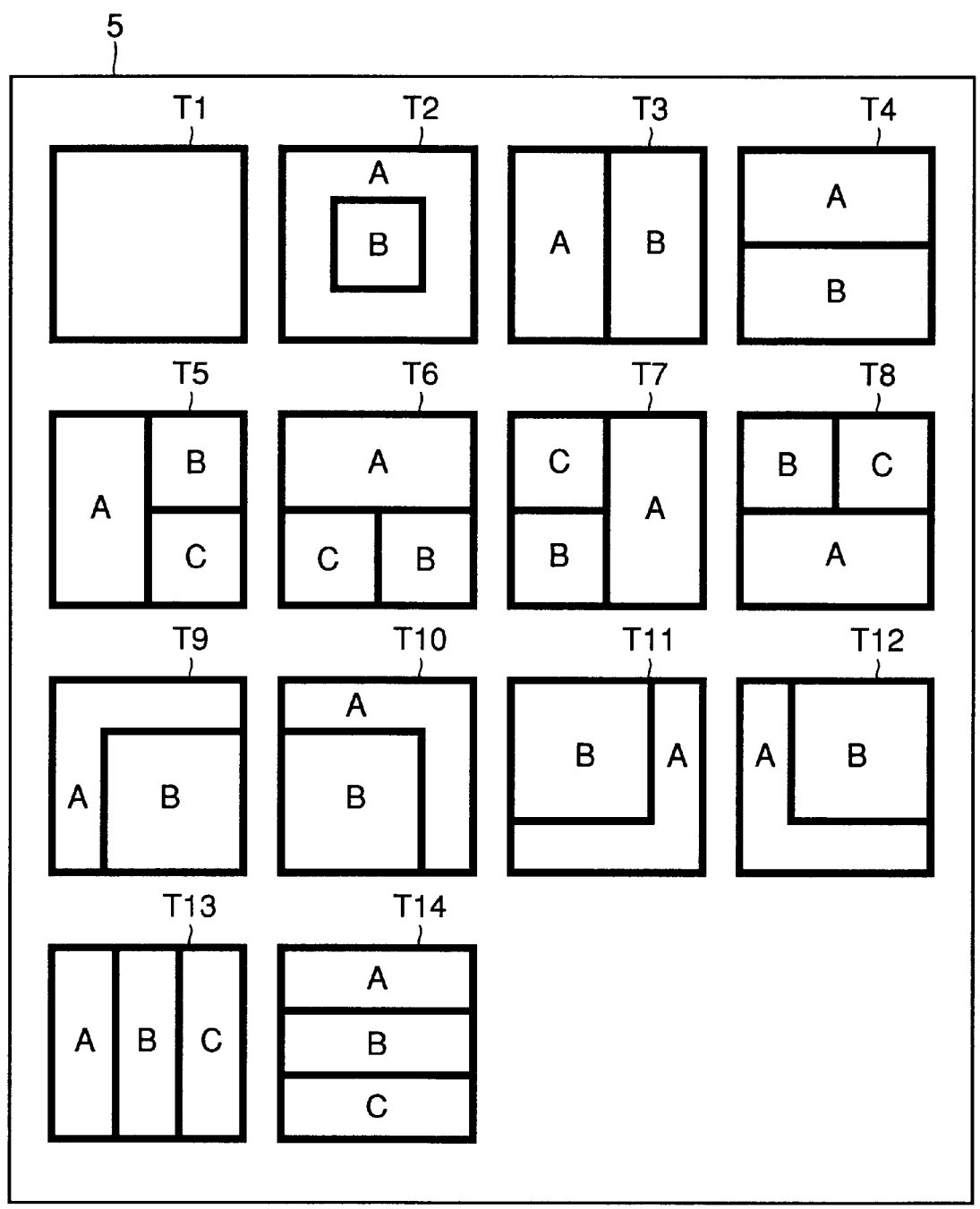
FIG. 4 is a diagram showing forms of types defined as geometric information by a character area DB according to an embodiment of the present invention.

Forms of the types defined by character area DB 5 according to the embodiment of the present invention is shown as geometric information in FIG. 4. Character area DB 5 classifies the geometric configurations of the characters consisting of character areas A, B and C into types T1–T14. Character areas are not limited to character areas A, B and C. In character area DB 5, configurations of kanjis including radicals (left-hand radical and light-hand radical) are classified into types T1–T14. Characters other than kanjis are equally classified into type T1.

Here, in character area DB 5, geometric configurations of the characters are classified into types T1–T14, but the number of types may be other than fourteen. In addition, though in the embodiment, types T1–T14 are prepared independently, it is possible to prepare only type T2 and generate other types by turning or combining type T2 together. In this case, types T9–T12 can be generated by enlarging or reducing the inner character area B of type T2. Types T5–T8 can be generated by inserting a reduced type T4 into one of a rectangular character area of type T3. In addition, all types can be prepared by preparing two types T3 and T4, and generating other types in a similar manner.

Figure 6:
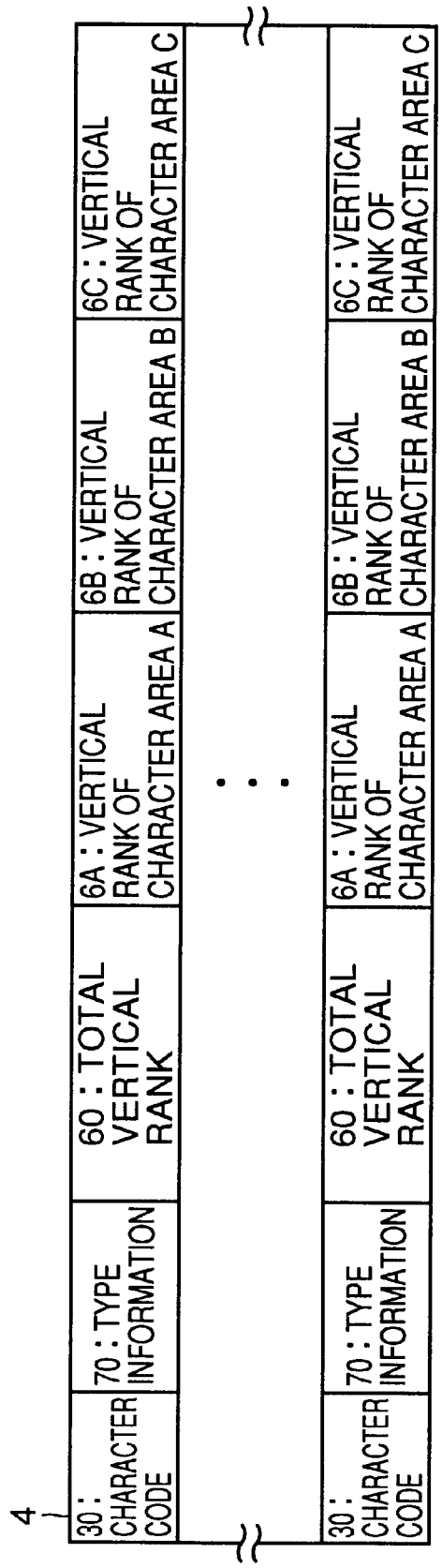
FIG. 6 is a diagram showing a structure of a vertical rank DB according to an embodiment of the present invention.

FIGS. 5 and 6 show structures of horizontal rank DB and vertical rank DB according to the embodiment of the present invention, respectively. Here, the rank indicates the number of strokes of the character.

In FIG. 5, horizontal rank DB 3 includes character code 30, type information 70, a total horizontal rank 50, a horizontal rank 5A of a character area A, a horizontal rank 5B of a character area B and a horizontal rank 5C of a character area C for each of the plurality of characters.

In FIG. 6, vertical rank DB 4 includes character code 30, type information 70, a total vertical rank 60, a vertical rank 6A of character area A, a vertical rank 6B of character area B and a vertical rank 6C of character area C for each of the plurality of characters.

Type information 70 indicates one of types T1–T14 in character area DB 5 shown in FIG. 4 allotted according to the structure of the character corresponding to character code 30.

Total horizontal rank 50 indicates the total number of strokes of a corresponding character in a horizontal direction. Respective horizontal ranks 5A, 5B and 5C of character areas A, B and C indicate the numbers of horizontal strokes in character areas A, B and C of type Ti (where i is one of one to fourteen) in character area DB 5 indicated by a corresponding type information 70.

Total vertical rank 60 indicates the total number of strokes of a corresponding character in a vertical direction. Respective vertical ranks 6A, 6B and 6C of character areas A, B and C similarly indicate the numbers of vertical strokes in character areas A, B and C of type Ti (where i is one of one to fourteen) in character area DB 5 indicated by a corresponding type information 70.

Horizontal rank DB 3 and vertical rank DB 4 include a horizontal rank and a vertical rank of each character area corresponding to type Ti (i is one of one to fourteen) indicated by a corresponding type information 70. Here, a horizontal rank and a vertical rank of each of character areas A, B and C are shown to be included, as an example.

Figure 7A:
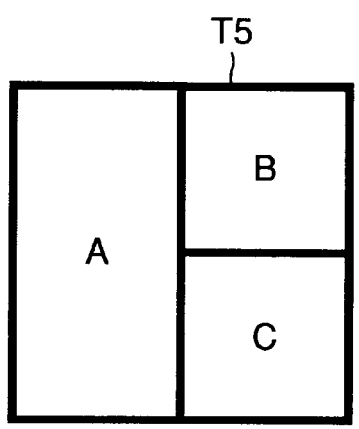
FIGS. 7A and 7B are diagrams referenced for describing a character area circumscribing frame and a character area splitting frame of a character according to an embodiment of the present invention.
Figure 7B:
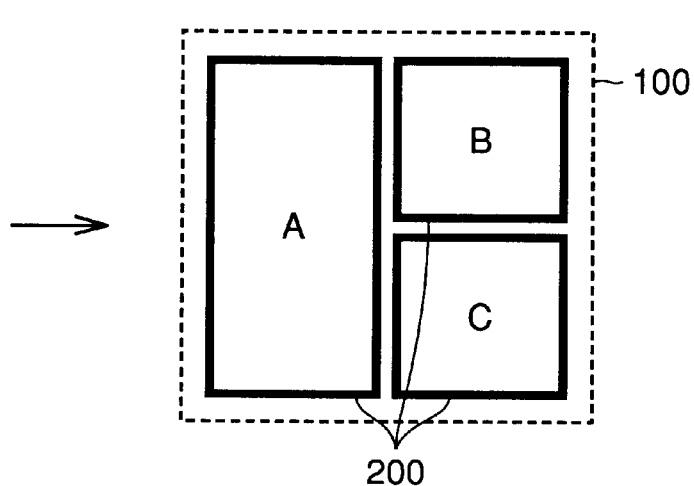

With reference to FIGS. 7A and 7B, the character area circumscribing frame and the character area splitting frame according to the embodiment of the present invention will be described. Here, a character area circumscribing frame 100 is indicated by a dotted line which surrounds the body size area of a character of type T5 in character area DB 5, as an example. In addition, in character area circumscribing frame 100, character area splitting frames 200s are indicated by solid lines that split each of areas A–C shown in character area DB 5.

In stroke correction table 132 shown in FIG. 1, element (modeling) information to be attached to a skeleton of an element according to each element code 33 of rule base skeleton DB 1 shown in FIG. 2 is stored. In priority determination rule 131, reference data to be referenced for determining the priority of stroke omission in stroke omission process described below is previously set.

Figure 9:
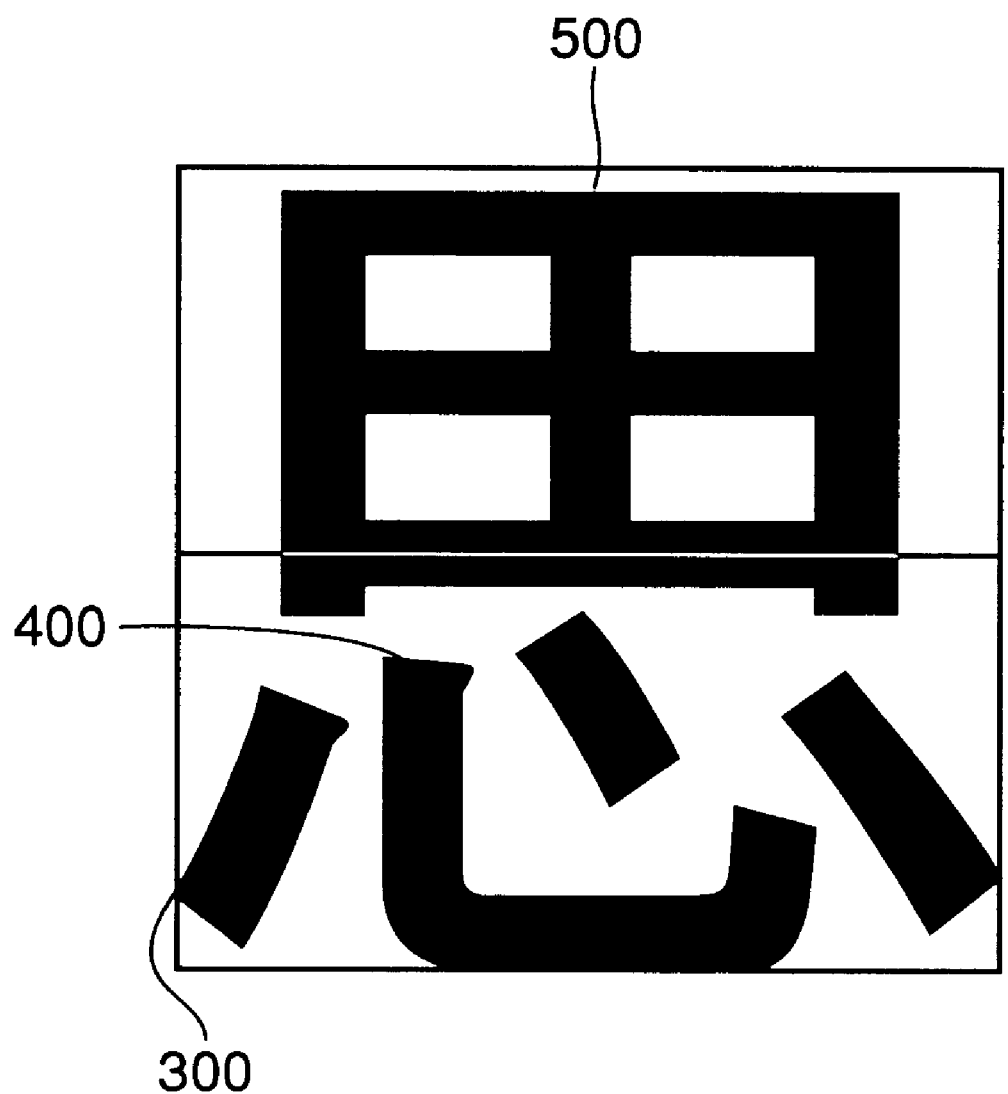
FIG. 9 is a diagram referenced for describing a point, a line, and a lengthwise line regarding a stroke of a character in character font generation according to an embodiment of the present invention.

In FIGS. 8A–8C, a structure of character area balance DB 6 according to the embodiment of the present invention is shown. In FIG. 9, a point 300, a line 400 and a lengthwise line 500 relating to a stroke of a character in character font generation according to the embodiment of the present invention are shown.

As shown in FIG. 9, an edge portion of a stroke such as an end portion of a straight line (tome), a dot (ten), an upward short hook-like portion (hane) and a downward short slanting portion (harai) is referred to as point 300, an edge line of a vertical stroke or a horizontal stroke (a line showing the stroke width at the edge) is referred to as line 400 and a lengthwise line of a vertical stroke or a horizontal stroke is referred to as lengthwise line 500.

In the embodiment of the present invention, omission of the stroke is performed in the character font generation as described below if necessary. By focusing on and utilizing contact or overlapping of point 300, line 400 and lengthwise line 500 of each stroke with another stroke, each character area splitting frame 200 and character area circumscribing frame 100, omission of the stroke is performed. Here, the state of contact or overlapping of point 300 of a stroke with another stroke, character area splitting frame 200 or character frame circumscribing frame 100 is referred to as a point contact and the similar states of line and lengthwise line are referred to as a line contact and lengthwise line contact, respectively.

Figure 10:
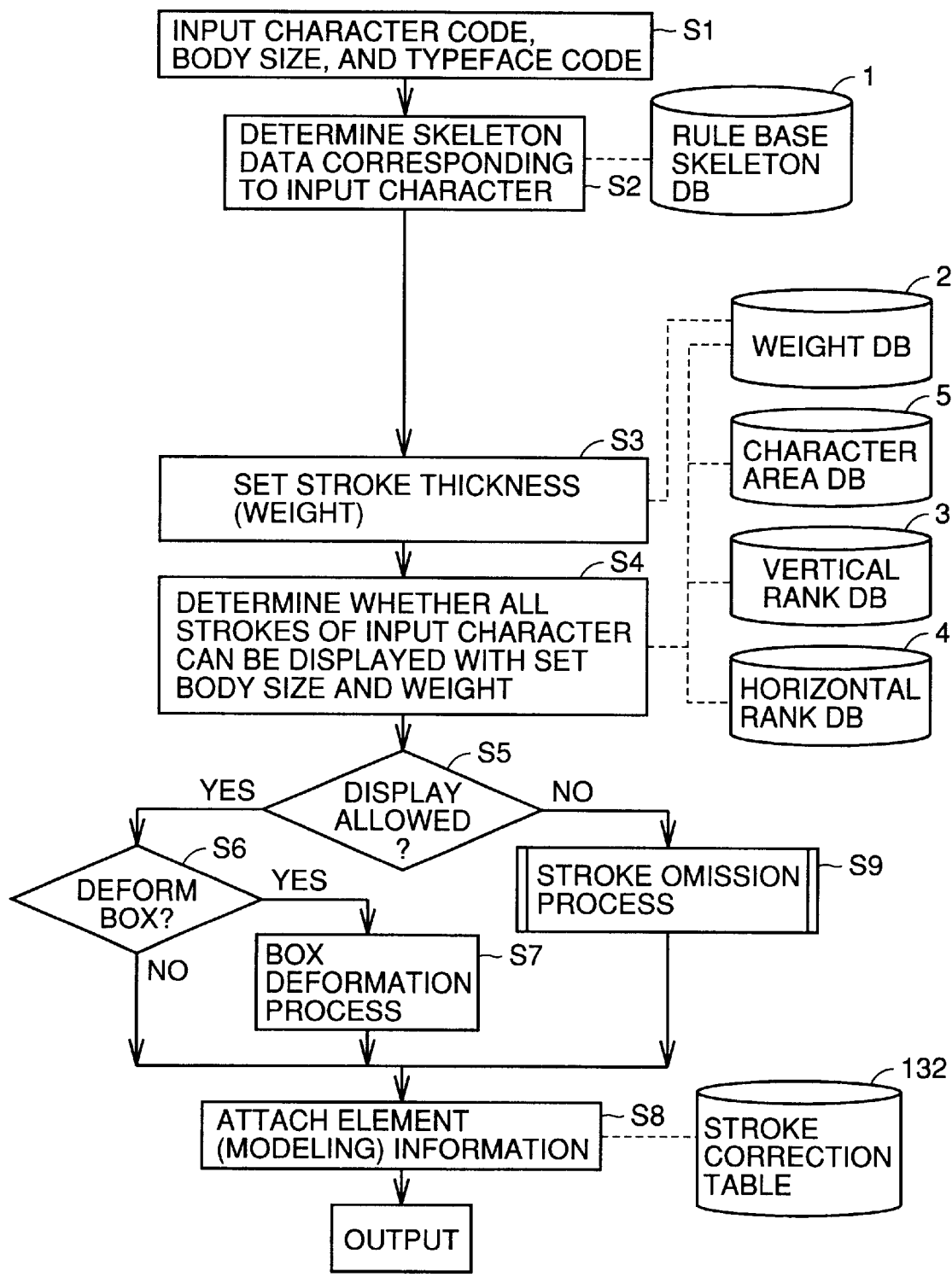
FIG. 10 is a schematic flow chart of a character font generation process according to an embodiment of the present invention.

With reference to FIG. 10, character font generation process according to the embodiment of the present invention will be described. A flow chart shown in FIG. 10 is previously stored as a program in storage unit 13 or memory 11 and executed under the control of CPU10.

First, a character code, a body size of a character to be output and a typeface code specifying a typeface are input through input unit 14 and set (S1). The body size is determined according to a size of an output area of output unit 15, such as the size of display area of a liquid crystal display and the number of characters output thereto.

Based on the input character code and the typeface code, rule base skeleton DB 1 of a corresponding character code 30 is then searched and skeleton data, that is, information corresponding to the input typeface code is determined (S2). In this case, the skeleton data includes an element attachment information (element code 33, number of skeleton points 34 and pointer 35 to skeleton point coordinate data) corresponding to each element indicated by number of elements 32 and skeleton point coordinate data 37 of the input character.

Based on the skeleton data thus determined for the input character, a skeleton is formed for each stroke and thickness (weight) is set (S3). Weight DB 2 is searched based on the number of elements (total number of strokes) of the input character obtained from rule base skeleton DB 1, and the thickness is indicated by vertical stroke width 41 and horizontal stroke width 42 corresponding to number of strokes 40 coinciding with number of elements 32.

Thus, the stroke width is set with the use of vertical stroke width 41 and horizontal stroke width 42 for each of all strokes of the input character. As the stroke widths in one character are adjusted to prevent irregularity, the blackness (density) of the character at the output of the character is made uniform and the visibility is improved.

Next, whether all the strokes of the input character can be correctly displayed (output) with the set body size and the weight according to the resolution of output unit 15 is determined (S4). In the example, it is determined for each stroke of the character, whether the one of the above mentioned point contact, line contact and lengthwise line contact will occur when the input character is displayed in character area circumscribing frame 100, in a horizontal stroke width 42 and a vertical stroke width 41 respectively set by total horizontal rank 50 (total number of horizontal strokes) in horizontal rank DB 3 and total vertical rank 60 (total number of vertical strokes) in vertical rank DB 4 corresponding to character code 30 of the input character.

In addition, a horizontal rank (the number of horizontal strokes) and a vertical rank (the number of vertical strokes) in each of character areas A–C are specified according to type Ti (i is one of one to fourteen) in character area DB 5 indicated by type information 70 in horizontal rank DB 3 and vertical rank DB 4 corresponding to character code 30 of the input character. Then, whether one of point contact, line contact, and lengthwise line contact has occurred between character area splitting frame 200 and a stroke in each character area is determined in the same manner as described above.

When the character is output according to the resolution of output unit 15 in the body size and the weight set for the input character as described above, if one of point contact, line contact and lengthwise line contact has occurred between a stroke and a stroke, a stroke and character area circumscribing frame 100 or a stroke and character area splitting frame 200, the correct display (output) of the character is determined to be impossible (NO in S5), and the stroke omission process (S9) described below is performed.

Conversely, if the correct display (output) of the character is determined to be possible (YES in S5), whether the deformation of BOX, that is, the body size (length and width) of the character, is to be performed or not is determined (S6) and the deformation is performed if necessary (S7).

Then, to all the character font including the font of the character subjected to the stroke omission process (S9) described below, element (modeling) information is attached with reference to stroke correction table 132 (S8) and the character is output through output unit 15.

Figure 11:
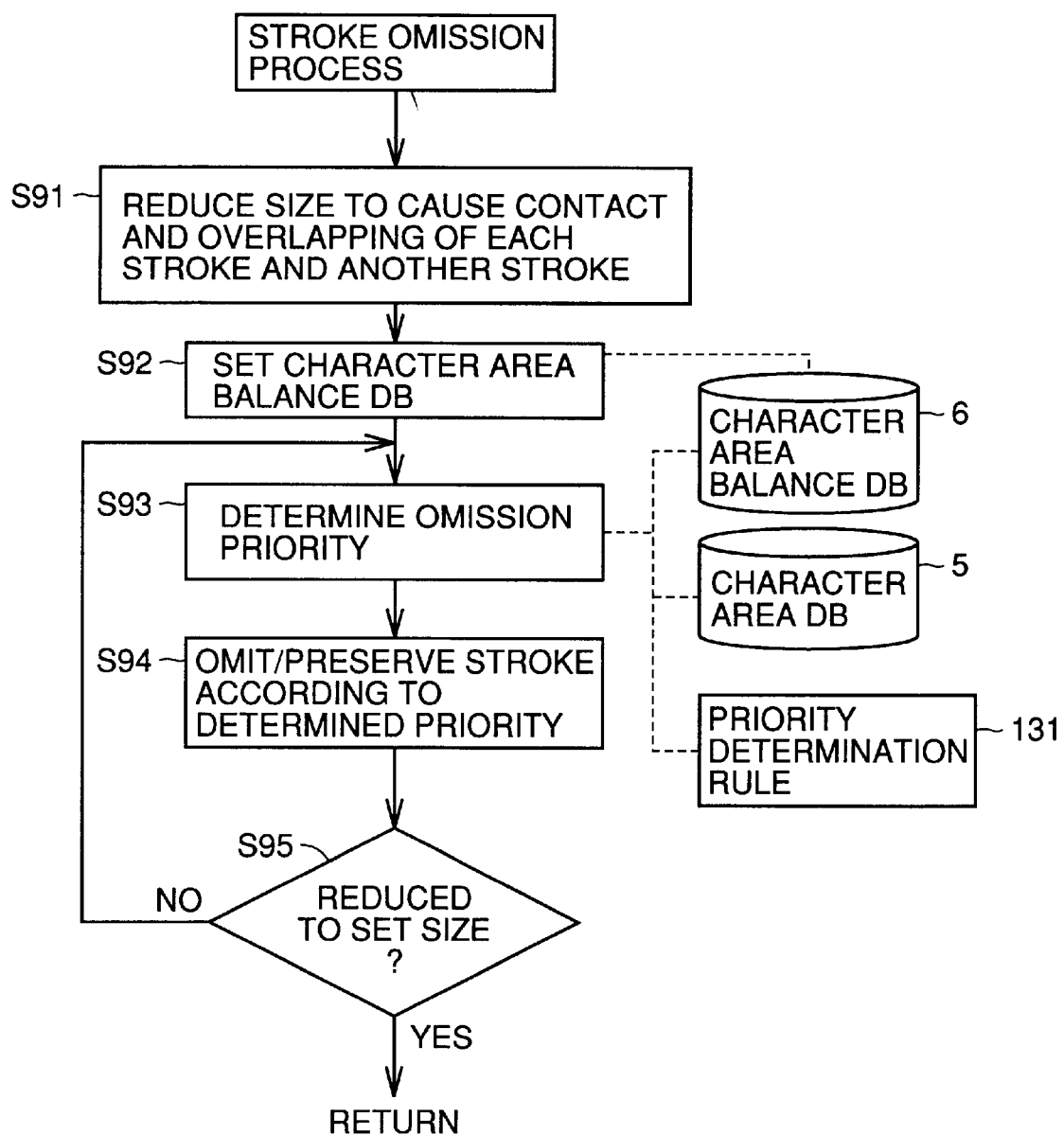
FIG. 11 is a flow chart of a stroke omission process according to an embodiment of the present invention.

With reference to FIG. 11, the stroke omission process according to the embodiment of the present invention will be described. First, the body size of the input character is set so that one of point contact, line contact, and lengthwise line contact has occurred either between a stroke and a stroke, a stroke and character area circumscribing frame 100, or a stroke and character area splitting frame 200 (S91). In particular, it is assumed that a basic character font size which would not cause any of point contact, line contact and lengthwise line contact between a stroke and a stroke or a stroke and either of the frames is 1000×1000. The basic size is gradually reduced down to a size (40×40, for example) which will cause either of point contact, line contact, and lengthwise line contact between a stroke and a stroke or a stroke and either of the frames.

The reduction of the character font size is performed such that the balance among the sizes of character areas in type Ti (i is one of one to fourteen) in character area DB 5 indicated by type information 70, total horizontal rank 50, and total vertical rank 60 in horizontal rank DB 3 and vertical rank DB 4 and vertical stroke width 41 and horizontal stroke width 42 specified by weight DB 2 are maintained for the character.

Then, character area balance DB 6 shown in FIGS. 8A–8C are separately prepared and set for the output character reduced in the above described manner. In FIG. 8A, character area balance DB 6 for each output character includes character code 30, type information 70 indicating a corresponding type in character area DB 5, and a width Wj (j=1, 2, 3, ..., N) and height Hj of a character area, ratios RXj and RYj (hereinafter referred to as character area ratio) of character area to character area circumscribing frame 100 in X and Y directions, information SIj on the number of strokes included in each character area and contact information CIj of character area for each of N character areas.

As shown in FIG. 8B, information SIj on the number of strokes in the character area includes the number of vertical strokes VS, the number of horizontal strokes HS and the number of slanting strokes SS in vertical, horizontal and slanting directions in the character area, respectively. As shown in FIG. 8C, contact information CIj of the character area includes the number of point contacts, the number of line contacts and the number of lengthwise line contacts between a stroke and each of an upper line, a right-side line, a lower line and a left-side line of the splitting frame 200 of the character area.

Next, the stroke omission of the character to be output is performed as described below with reference to character area DB 5 and character area balance DB 6.

Generally, when the character is to be visually identified, the character is first cognized generally by its shape (contour). In the embodiment, noting this fact, the stroke omission process is performed so as to maintain the shape (contour) of the character. In FIGS. 12A–I, an example of the stroke omission process in FIG. 11 is described in detail and in FIG. 13 the procedure to determine the portion to be omitted from the character during the stroke omission process shown in FIG. 11 is described.

Now, it is assumed that the stroke omission is performed for the Chinese character "崎".

Figure 13:
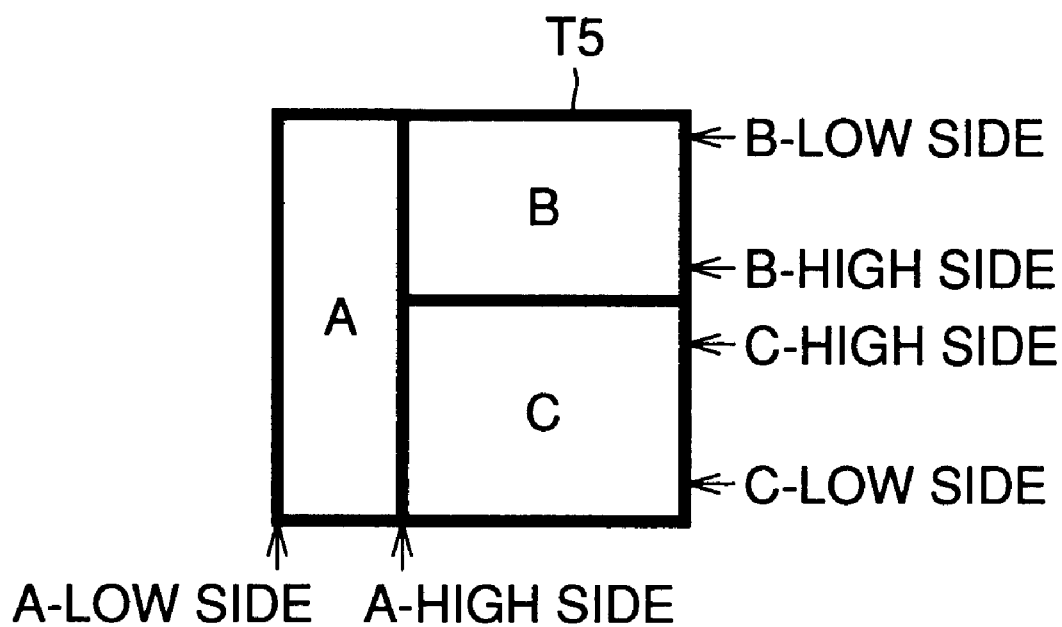
FIG. 13 is a diagram referenced for describing a procedure for determining a portion of a character to be omitted in a stroke omission process shown in FIG. 11.

With reference to character area DB 5 and character area balance DB 6, the character "崎" is classified into type T5 as shown in FIG. 13 and is specified to be divided into character areas A, B and C. In addition, in FIG. 13, the tendency toward stroke omission at each side of character areas is indicated. In character area A, tendency is high at an A-high side and low at an A-low side, in character area B, tendency is high at a B-high side and low at a B-low side, and in character area C, tendency is high at a C-high side and low at a C-low side. Tendency of stroke omission in each character area is high at the side character area splitting frames 200s contact and low at the side opposing to another frame.

Figure 12A:
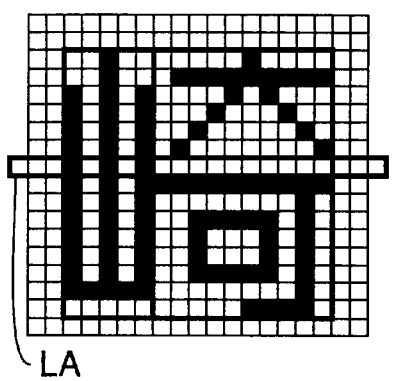
FIGS. 12A–12I are diagrams referenced for describing a detailed example of a stroke omission process shown in FIG. 11.

The priority of the stroke omission is determined first (S93). In particular, a differential value of a current ratio of character area B to C in Y (vertical) direction (7:8) and a ratio of character area ratio RYj of character area B to that of character area C shown in character area balance DB 6 (character area ratio RYj of character area B: character area ratio RYj of character area C) is compared with a predetermined value. Then according to the result of comparison, which stroke in either of character areas B or C is to be omitted is determined. Now, if a stroke in character area B is determined to be omitted according to the comparison result, a stroke located at the B-high side of character area B shown in FIG. 13 is first omitted and a line LA in FIG. 12A is omitted resulting in the state shown in FIG. 12B (S94). Then whether the body size resulting from the omission reaches the set body size or not is determined (S95), and if not (NO in S95) the same process will be repeated.

There are various typefaces of character and each typeface has a specific balance including the center and centroid of the character. In the stroke omission process, a specific balance of the character is intended to be maintained, and the character area ratios RXj and RYj are constantly referenced to and maintained such that the typeface will not be changed.

Figure 12B:
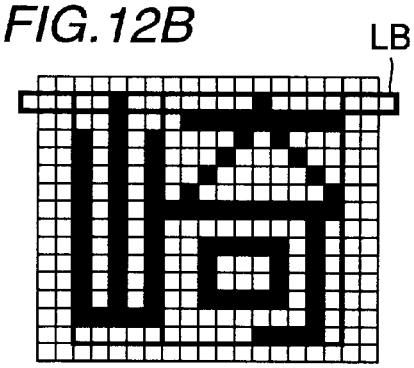

Next, with reference to character area ratio RXj and RYj in character area balance DB 6, a differential value of a current ratio of character areas B to C in Y (vertical) direction (6:8) shown FIG. 12B and ratio RYj of character area B: ratio RYj of character area C is compared with a predetermined value. Based on the result of comparison, which stroke in either of character areas B or C is to be omitted is determined. Now, if a stroke in character area B is determined to be omitted, a stroke located at the B-low side of character area B shown in FIG. 13 is omitted. In this case, a dot of a line LB shown in FIG. 12B is to be omitted. With reference to character area balance DB 6, as a stroke of line LB is not in lengthwise line contact with character area splitting frame 200 in contact with character area circumscribing frame 100, in other words, the stroke does not relate to shape (contour) maintenance of the character, the stroke is omitted according to the priority determination rule 131. Thus the state shown in FIG. 12B is turned to the state shown in FIG. 12C (S94).

Thus, when the omission is performed in the same character area, a portion to be omitted is alternately set from the high-side to the low-side and again to the high-side and to the low-side, in order to maintain the specific balance and shape of the character.

If the body size resulting from the omission does not reach the set body size (NO in S15), the same process of stroke omission is repeated.

Figure 12C:
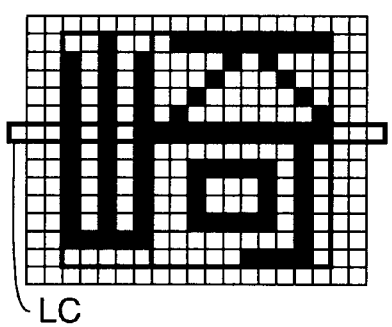

Similarly, if a stroke in character area C is determined to be omitted, for example, based on the comparison result between a differential value of the character area ratio in character area balance DB 6 and a current character area ratio of FIG. 12C and a predetermined value, the C-high side of character area C is moved one dot inward character area C as shown in FIG. 13. In this case, a line LC in FIG. 12C should have been erased. According to priority determination rule 131, however, as a stroke of character area C corresponding to line LC is in lengthwise line contact with character area splitting frame 200, whether the line should be erased or not is determined according to the following procedure.

First, with reference to contact information CIj for each character area in character area balance DB 6, as the stroke in character area C corresponding to line LC of FIG. 12C is in lengthwise line contact with character area splitting frame 200 and the number of point contacts U1 (or the number of line contacts U2 or the number of lengthwise line contacts U3) of a stroke in character area B is less than a predetermined value X, the stroke in character area C corresponding to line LC is determined not to be erased and to be preserved. Thus the state shown in FIG. 12C is turned to the state shown in FIG. 12D. In addition, the case in which the number of point contacts described above is equal to or more than predetermined value X is described in FIG. 12H, for example. In this case, as a stroke corresponding to a line LH is in lengthwise line contact with character area splitting frame 200 and the number of point contacts R1 (or the number of line contacts R2 or the number of lengthwise line contacts R3) of strokes in character areas B and C is not less than predetermined value X, line LH is erased according to priority determination rule 131. Then, the state shown in FIG. 12H is turned to a state shown in FIG. 12T.

Thus, the character stroke omission is performed mainly in the inner area of the character area in order to maintain the shape (contour) of the character. Therefore, when strokes are adjacent to each other, or character area splitting frame 200 and a stroke are adjacent to each other, whether the stroke is to be erased or not (degree of priority) is determined according to priority determination rule 131 based on the manner of contacts including the form and the number of adjacent strokes, that is point contact, line contact, or lengthwise line contact, and the number thereof.

Figure 12D:
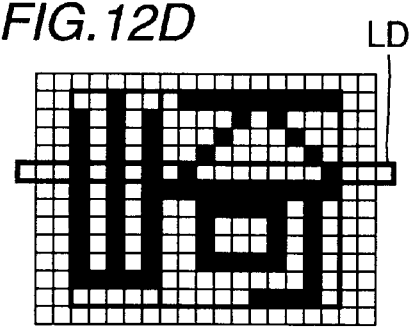
Figure 12E:
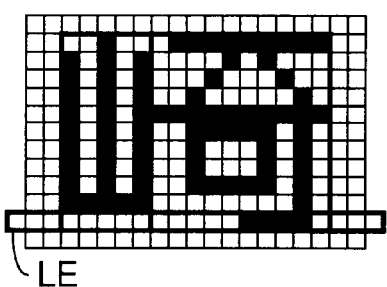

In the character of FIG. 12D, if the omission at the B-high side of character area B is determined as a result of the similar process (S93), a line LD of FIG. 12D is erased (S94)

resulting in the state shown in FIG. 12E. As the body size of FIG. 12E does not reach the set body size (NO in S95), the same process is repeated for the character in FIG. 12E and the erasure at the C-low side of character area C is determined to be performed (S93). Here, as a stroke to be omitted in character area C corresponding to a line LE of FIG. 12E is in lengthwise line contact with character area splitting frame 200 and the distance from the character to character area circumscribing frame 100 is shortest at this stroke, line LE including this stroke is not erased and maintained to preserve the shape (contour) of the character. At the same time, the C-low side of character area C of FIG. 12(E) is moved one dot inward, resulting in the state of FIG. 12F (S94).

Figure 12F:
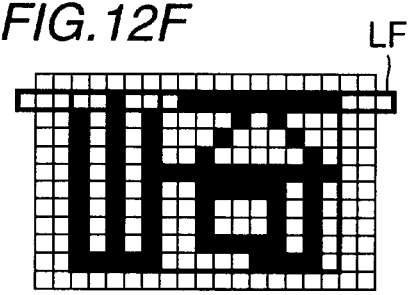
Figure 12G:
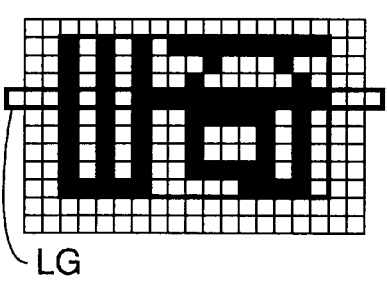
Figure 12H:
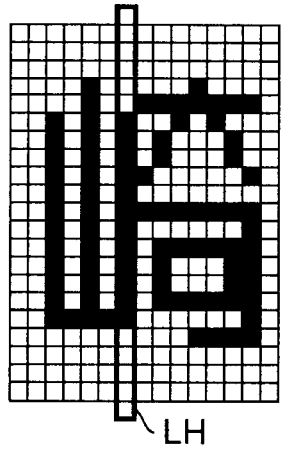
Figure 12I:
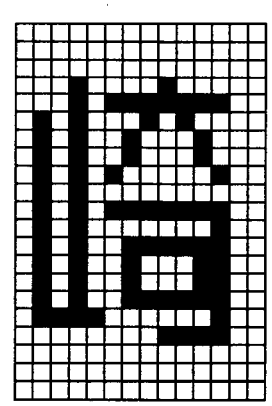

As the body size of FIG. 12F does not reach the set body size (NO in S95), the same process is repeated for the character of FIG. 12F and the omission of a stroke at the B-low side of character area B is determined to be performed (S93). Here, a stroke to be omitted of character area B corresponding to a line LF of FIG. 12F is preserved according to priority determination rule 131 similarly to the stroke in line LE. The stroke at the B-low side of character area B shown in FIG. 12F is moved one dot inward, resulting in the state of FIG. 12G (S94). By repeating the same process, the stroke is omitted until the size is reduced to the set body size, whereby the character font with the set body size can be obtained. Then the flow proceeds to a step (S8) for attaching the element information as shown in FIG. 10. With reference to stroke correction table 132, the element (modeling) information is attached to the skeleton font having the set body size with strokes omitted. The character is output according to the resulting font through output unit 15.

In the character font generation of the embodiment, an output is in two values that is black and white, but a color output can be applied as well. The output may be gradational.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of character font generation comprising the steps of:

determining whether a character can be output in a desired font to an output unit having a predetermined resolution, prioritizing a plurality of strokes of the character for omission, and omitting one of said plurality of strokes of said character based upon the determined priority, so as to make the character a permissible size according to said predetermined resolution, in response to determining that the character cannot be output, wherein the omission is performed so as to maintain balance and preserve a shape of the character, wherein said step of omitting includes:

reducing the character until each stroke of the character comes into contact with another stroke, a circumscribing frame surrounding a body size area of the character and a splitting frame splitting said body size area into a plurality of character areas based on a structure of the character; and generating a character area balance database including ratios of a size of said splitting frame to a size of said circumscribing frame and contact information regarding a manner of contact of a stroke, with each line of splitting frame in each of said splitting frame for each of said character areas being based on a reduction result of said reduction step wherein the stroke of the character that is to be omitted is determined based on said contact information, and the stroke is omitted until a size of the character becomes the permissible output size, with said ratios of each character area in said character area balance database being maintained.

2. An apparatus for character font generation comprising:

determination means for determining whether a character can be output in a desired font to an output unit having a predetermined resolution; and omission means for omitting a stroke of said character so as to make the character a permissible size according to said predetermined resolution, according to said determination means determining that the character cannot be output, wherein the omission is performed so as to maintain balance and preserve a shape of the character, wherein the omission means includes:

means for prioritizing a plurality of strokes of the character for omission and for omitting one of said plurality of strokes based upon the determined priority;

reduction means for reducing the character until each stroke of the character comes into contact with another stroke, a circumscribing frame surrounding a body size area of the character and a splitting frame splitting said body size area into a plurality of character areas based on a structure of the character; and generation means for generating a character area balance database including ratios of a size of said splitting frame to a size of said circumscribing frame and contact information regarding a manner of contact of a stroke, with each line of splitting frame in each of said splitting frame for each of said character areas being based on a reduction result of said reduction means, wherein the stroke of the character that is to be omitted is determined based on said contact information, and the stroke is omitted until a size of the character becomes the permissible output size, with said ratios of each character area in said character area balance database being maintained.

3. The apparatus for character font generation according to claim 1, wherein said contact information includes;

a number of contacts between an edge portion of the stroke and said splitting frame line, a number of contacts between an edge line having a length corresponding to a width of the stroke and said splitting frame line and a number of contacts between a lengthwise line of the stroke and said splitting frame line.

4. The apparatus for character font generation according to claim 3, wherein in the determination of said stroke to be omitted, when said contact information indicates the contact of the lengthwise line of the stroke and said splitting frame line, if a distance between the lengthwise line of the stroke and said circumscribing frame is relatively shortest, the stroke will not be omitted and, if a distance between the lengthwise line of the stroke and said circumscribing frame is relatively longer, the omission of the stroke is determined based on said contact information of an adjacent stroke.

5. The apparatus for character font generation according to claim 2, wherein a width of the stroke of the character is set according to a total number of strokes in the character in said desired font.

6. The apparatus for character font generation according to claim 1, wherein one of a plurality of splitting patterns previously prepared is applied for splitting said body size area based on the structure of the character, and said plurality of splitting patterns are generated from a combination of at least one specific splitting pattern.

7. A computer readable storage medium storing a character font generation program for causing a computer to execute a method of character font generation for generating a font of a character to enable the output of the character through an output unit having a predetermined resolution, wherein said method of character font generation comprises the steps of;

determining whether said character can be output in a desired font to said output unit;

prioritizing a plurality of strokes of the character for omission; and omitting one of said plurality of strokes of said character based upon the determined priority so as to make said character a permissible size according to said predetermined resolution, in response to determining that the character cannot be output, wherein omission is performed so as to maintain balance and preserve a shape of the character, wherein said step of omitting includes:

reducing the character until each stroke of the character comes into contact with another stroke, a circumscribing frame surrounding a body size area of the character and a splitting frame splitting said body size area into a plurality of character areas based on a structure of the character; and generating a character area balance database including ratios of a size of said splitting frame to a size of said circumscribing frame and contact information regarding a manner of contact of a stroke, with each line of splitting frame in each of said splitting frame for each of said character areas being based on a reduction result of said reduction step, wherein the stroke of the character that is to be omitted is determined based on said contact information, and the stroke is omitted until a size of the character becomes the permissible output size, with said ratios of each character area in said character area balance database being maintained.

* * * * *